United States Patent
Foegelle

(10) Patent No.: US 8,331,869 B2
(45) Date of Patent: Dec. 11, 2012

(54) SYSTEMS AND METHODS FOR OVER THE AIR PERFORMANCE TESTING OF WIRELESS DEVICES WITH MULTIPLE ANTENNAS

(75) Inventor: Michael Foegelle, Austin, TX (US)

(73) Assignee: ETS Lindgren, L.P., Cedar Park, TX (US)

( * ) Notice: Subject to any disclaimer, the term of this patent is extended or adjusted under 35 U.S.C. 154(b) by 771 days.

(21) Appl. No.: 11/880,867

(22) Filed: Jul. 24, 2007

(65) Prior Publication Data

US 2008/0056340 A1     Mar. 6, 2008

Related U.S. Application Data

(60) Provisional application No. 60/832,989, filed on Jul. 24, 2006.

(51) Int. Cl.
*H04B 17/00* (2006.01)

(52) U.S. Cl. .................. 455/67.12; 455/67.11; 455/425; 455/226.1; 455/304; 455/115.2

(58) Field of Classification Search .................. 455/424, 455/67.11, 146, 225, 303, 500–506, 67.12; 343/893, 703; 375/224, 115.1; 370/241
See application file for complete search history.

(56) References Cited

U.S. PATENT DOCUMENTS

| | | | |
|---|---|---|---|
| 5,530,412 A * | 6/1996 | Goldblum | 333/232 |
| 5,794,128 A * | 8/1998 | Brockel et al. | 455/67.11 |
| 6,208,841 B1 * | 3/2001 | Wallace et al. | 455/67.12 |
| 6,308,072 B1 * | 10/2001 | Labedz et al. | 455/448 |
| 6,571,082 B1 * | 5/2003 | Rahman et al. | 455/67.11 |
| 6,687,650 B2 * | 2/2004 | Hatanaka et al. | 702/182 |
| 6,885,348 B1 * | 4/2005 | Ryken et al. | 343/703 |
| 7,035,594 B2 * | 4/2006 | Wallace et al. | 455/67.12 |
| 7,280,466 B2 * | 10/2007 | Tong et al. | 370/208 |
| 7,286,802 B2 * | 10/2007 | Beyme et al. | 455/67.14 |
| 7,508,868 B2 * | 3/2009 | Chang | 375/224 |
| 7,890,821 B2 * | 2/2011 | Music et al. | 714/715 |
| 2003/0236089 A1 * | 12/2003 | Beyme et al. | 455/423 |
| 2006/0194553 A1 * | 8/2006 | Ozaki et al. | 455/226.1 |
| 2006/0229020 A1 * | 10/2006 | Mlinarsky et al. | 455/67.14 |
| 2006/0233111 A1 * | 10/2006 | Wright | 370/241 |

* cited by examiner

*Primary Examiner* — Matthew Anderson
*Assistant Examiner* — Ganiyu Hanidu
(74) *Attorney, Agent, or Firm* — Christopher & Weisberg, P.A.

(57) ABSTRACT

Embodiments include systems and methods for testing a wireless device, especially one with multiple antennas. In one embodiment, a plurality of antennas are placed around a device under test in an anechoic chamber. Each of a plurality of the antennas is connected to a path of a variable path simulator capable of generating multiple paths between the antennas and external wireless communication test equipment. The variable path simulator introduces a delay spread into each path. In this way, a multipath environment is simulated with signals appearing to arrive from different angles and different distances.

19 Claims, 7 Drawing Sheets

SYSTEMS AND METHODS FOR OVER THE AIR PERFORMANCE TESTING OF WIRELESS DEVICES WITH MULTIPLE ANTENNAS

FIELD

The present invention is in the field of RF and microwave measurements. More particularly, the invention is in the field of complex radiation pattern measurements for testing the radiated performance of wireless devices.

BACKGROUND

Over the air (OTA) performance testing of active wireless devices has become an important part of evaluation and certification criteria. Existing test methodologies are extensions of traditional antenna pattern measurement techniques. A critical assumption of these methods is that the device under test utilizes a single active antenna. Advances in wireless technology continue to incorporate more complex antenna systems, starting with simple switching diversity and progressing to more advanced concepts such as adaptive arrays (smart antennas) and multiple-input multiple-output (MIMO) technologies. These technologies combine multiple antennas with various software algorithms that can dynamically change the behavior of the antennas during the test, negating the assumption that each position and polarization of an antenna pattern measurement represents a single component of the same complex field vector. In addition, MIMO technologies rely on the multipath interaction and spatial relationship between multiple sets of antennas. An anechoic chamber with a single measurement antenna cannot simulate the environment necessary to evaluate the performance of a MIMO system. New measurement methods and system technologies are needed to properly evaluate these technologies.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

Figure 1:
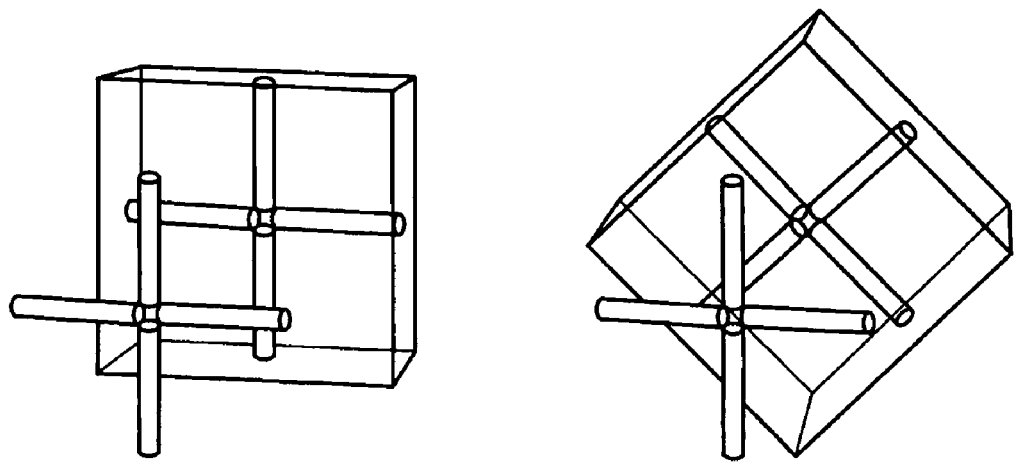
FIG. 1 depicts measuring a polarization diversity device with two different orientations.

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for testing a wireless device, especially one with multiple antennas, in an artificial multipath environment intended to simulate real world multipath conditions. In one embodiment, a plurality of antennas are placed around a device under test in an anechoic chamber. Each of a plurality of the antennas is connected to an RF port of a variable path simulator capable of generating multiple paths between the antennas and external wireless communication test equipment. The variable path simulator introduces different delay spreads into each path. In this way, a multipath environment is simulated with signals appearing to arrive from different angles and different distances.

The wireless communication systems described and discussed herein are intended to represent any of a wide variety of wireless systems which may include without limitation, NFC (Near Field Communications), WPAN (Wireless Personal Area Network), WLAN (Wireless Local Area Network), WMAN (Wireless Metropolitan Area Network), WiMAX (Worldwide Interoperability for Microwave Access), 2.5-3G (Generation) cellular, 3G RAN (Radio Access Network), 4G, RFID (Radio Frequency Identification), etc.

Today's wireless OTA performance testing expands on traditional spherical antenna pattern measurement techniques by performing absolute power and sensitivity measurements of active devices. These methodologies incorporate scanning processes to measure the radiation pattern over the surface of a sphere. The critical assumption is that the device's radiation pattern remains unchanged during the time required to scan the entire surface of the sphere. Previously, the only time based concern has been amplifier drift and weakening battery of the active device.

However, now a variety of wireless technologies are adopting a range of adaptive antenna technologies, starting with simple switching diversity and extending to more advanced technologies such as adaptive arrays (smart antennas) and multiple-input multiple-output (MIMO) technologies. It can be shown that allowing these devices to adapt during an OTA performance test can easily invalidate the test result. However, given that many of these adaptive technologies provide a significant performance improvement in actual use, the question becomes how do we determine this performance improvement if the adaptive functionality is disabled? Ways must be found to either test these devices in full operation in a test environment that replicates realistic operation, or to use the existing test methods with custom test modes in order to numerically determine the resulting total performance.

Note that the majority of this discussion will reference only one propagation direction in the test system (i.e. from the measurement antenna to the DUT) but all descriptions are assumed to refer to a bi-directional link that must work the same in both directions.

Antenna diversity is a technology that is already used heavily in 802.11 devices and is beginning to make its way into some mobile phone designs. While there are a number of different implementations of diversity, such as switching diversity and maximal ratio combining, the basic concept is to improve link performance by using more than one antenna separated by some significant portion of a wavelength. As the name implies, switching diversity attempts to overcome the effects of nulls due to multipath fading by switching to whichever antenna performs better. It should be apparent that if a device under test (DUT) has two antennas mounted orthogonal to each other (polarization diversity) then the orientation of the device in the measurement system will change the measurement result.

FIG. 1 illustrates this configuration. If the DUT automatically switches to the internal antenna with the best coupling, then when the configuration on the left is used, the horizontal antenna will be active when the horizontal polarization component is measured and the vertical antenna will be active when the vertical polarization component is measured. However, when the DUT is tilted by 45°, then there is no polarization preference to the two antennas and either one may be active during the test. Assuming the DUT antennas are identical, the left case will result in a "measured" field vector value that is 3 dB higher than that of the right hand side. More importantly, the result is 3 dB higher than the device can actually produce! This is obviously not what's intended by the test.

Figure 2:
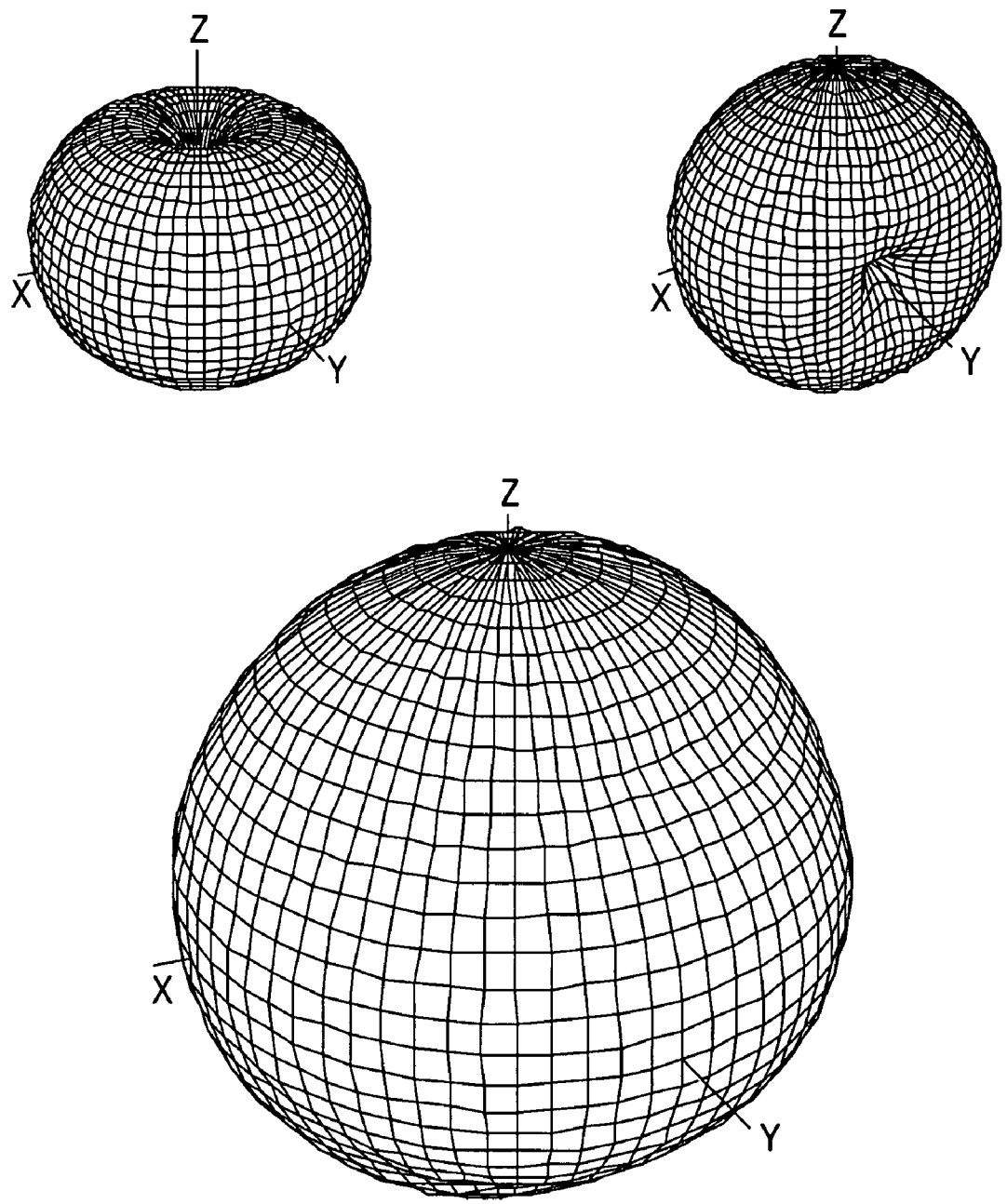
FIG. 2 depicts the expected radiated performance of a device with polarization diversity.

This example also illustrates the other conceptual problem with determining performance of adaptive devices. The fact that a device has the capability to adapt corresponds to some improvement in performance. That potential improvement can be seen by overlaying the patterns of the two dipoles and taking the higher value at each point, as shown in FIG. 2. It can be seen that just evaluating from a power perspective, the peaks of one antenna pattern fill the nulls of the other such that the deepest null remaining in the composite pattern is only −3 dB from the maximum. From a total performance perspective, evaluating quantities like Total Radiated Power (TRP) or Total Isotropic Sensitivity (TIS), this results in an apparent performance increase of 1.2 dB over that of an individual antenna.

Figure 3:
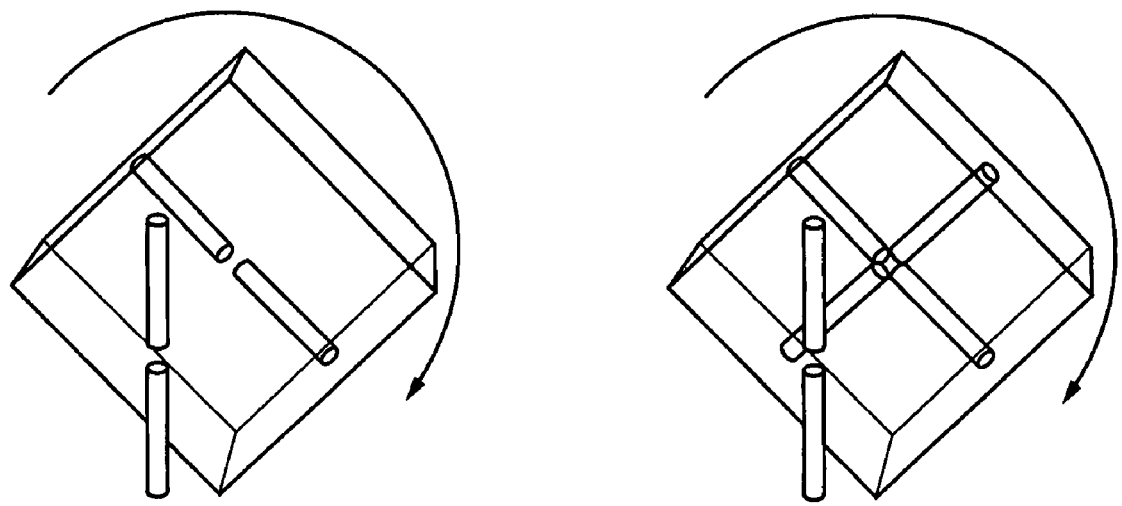
FIG. 3 depicts measurement of devices with and without polarization diversity.
Figure 4:
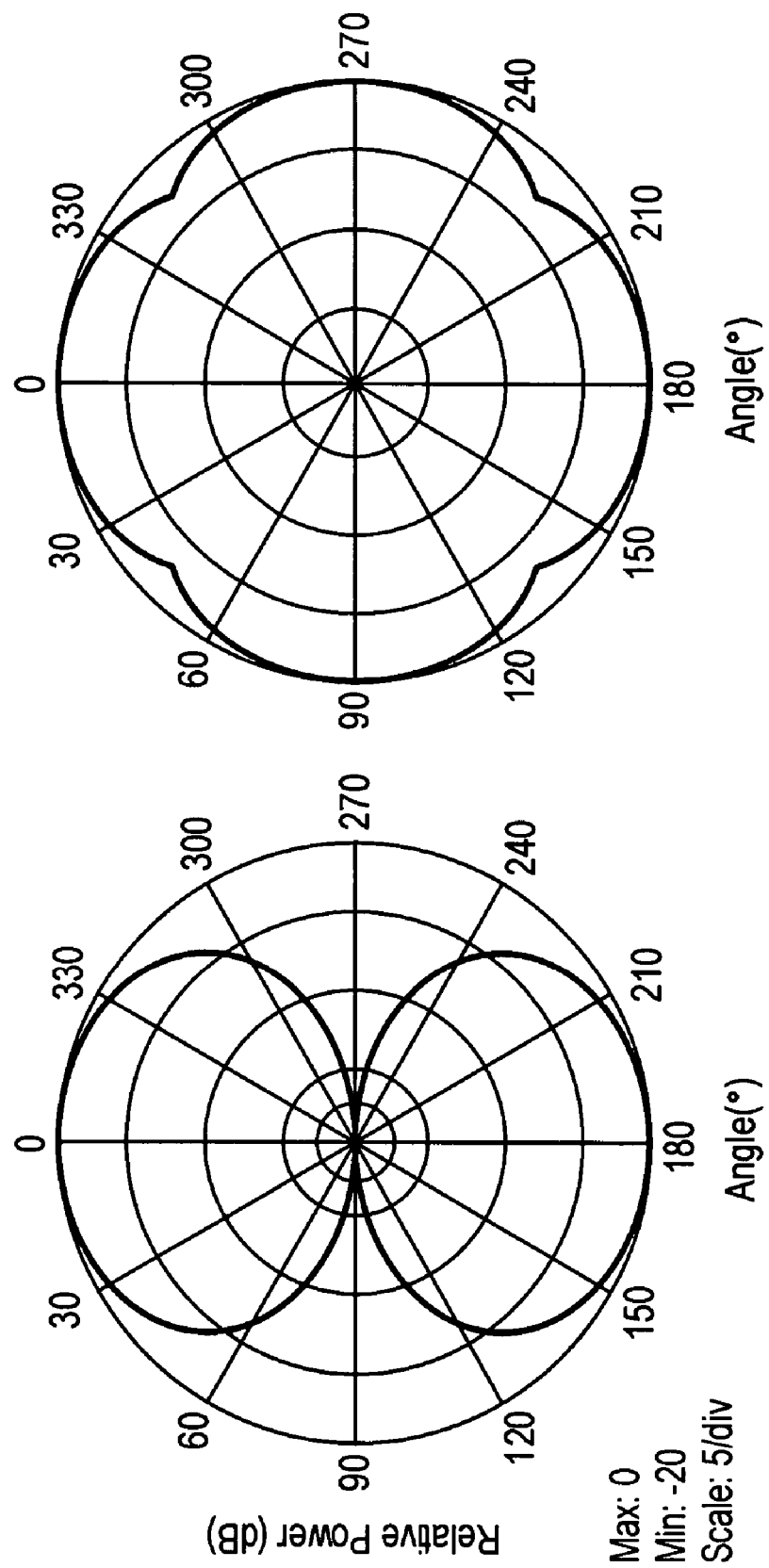
FIG. 4 depicts the performance gain provided by polarization diversity measured as in FIG. 3.

But what about the region where the two patterns overlap with equivalent values? Given that metrics like TRP and TIS represent an average performance in any direction, it still seems like polarization diversity should be producing an average performance gain in that case as a function of polarization angle. Consider the usage case in FIG. 3, where a single linearly polarized antenna from one device communicates with another device as it is rotated about the polarization axis. This results in pattern curves like those in FIG. 4. As expected, the average performance as a function of polarization angle for the single antenna system is −3 dB from the co-polarized orientation. However, the polarization diversity device, which never has a performance less than −3 dB at any angle, has an average performance of slightly better than −0.9 dB, resulting in an average performance improvement of 2.1 dB over a single antenna.

So, statistically, there is a performance gain to be seen from polarization diversity, and there is potentially a way to measure that gain. But what about switching diversity where the two antennas are parallel? In that case, tests in the free-space environment typically used for OTA performance tests would see no apparent improvement from the use of switching diversity. However, in the multipath environment where the device will typically be used in the real world, switching diversity does provide a statistical improvement over a device that only has one antenna. It is unclear how to represent this improvement.

For other diversity mechanisms, such as maximal ratio combining, where the received signals of both antennas are used to improve the sensitivity response of the device as a whole, there is a definite performance gain that should be measurable even in a free-space environment. However, there's still no guarantee that the results from measuring two orthogonal components in a given direction actually add to the performance that would be seen if a single linearly polarized antenna was aligned along the polarization direction of best overall performance.

From this evaluation, there are a number of possible solutions, but none of them solve every possible problem. If the DUT can be configured to use only one antenna at a time, then it is a straightforward matter to test each antenna separately using the traditional TRP/TIS systems. The limitations with this idea include the increased test time, the interpretation of the individual results to determine a total device performance value, the fact that it may not be possible (or easy) to test one antenna at a time, and that combinatorial diversity performance is a function of multiple antennas active simultaneously.

Another option would be to use a circularly polarized measurement antenna. Assuming the device is predominantly linearly polarized and can be made to switch to the "best" antenna at each point (i.e. by approaching sensitivity to force such a change), this approach should work well for most switching diversity systems. However, circularly polarized signals could produce totally unrealistic results in combinatorial diversity systems, and complex devices may have significant circular polarization components that could affect the result. A work-around to that issue would be to use a linearly polarized antenna and step through a range of polarization orientations to find the best performing linear polarization. However, that would increase the total test time involved by the number of polarization orientations tested.

Smart antennas (adaptive arrays or switched beams) further complicate the previous scenario. By definition, these antennas are designed to have adaptive antenna patterns, so any attempt to measure the performance of an active device with smart antennas using a traditional antenna pattern measurement would likely see the antenna adapting as it is measured. Again, if the adaptation can be disabled, it would be possible to measure a given antenna pattern, but determining the potential performance enhancement of the adaptation capability is still problematic. Potentially hundreds of patterns would have to be measured to determine some sort of average performance metric similar to TRP/TIS. Given that some adaptive technologies can alter their patterns to not only direct energy in a given direction or directions, but also to place a null towards an interfering signal, existing pattern measurement techniques cannot exercise the full range of capabilities of these adaptive technologies or determine their actual effectiveness. With signals coming from only one propagation direction at a time, it's not possible to evaluate the intelligence or capability of these adaptive algorithms.

Multiple-input multiple-output (MIMO) technologies introduce an unprecedented level of complexity to OTA performance testing. The technology takes advantage of the temporal and spatial relationship between multiple antennas and reflections from a multipath environment to allow multiple communication channels to share the same frequency bandwidth. In MIMO, N antennas transmit N uncorrelated signals on the same RF channel. Each of N receiving antennas receives the vector sum of all of the transmitted signals and any of their reflections throughout the environment. Since all of the antennas, both transmit and receive, are separated by some significant fraction of a wavelength, each receive antenna receives a considerably different signal that can be represented as some complex function of the N transmit signals. These N functions can be represented as an N×N matrix representing N equations with N unknowns. Provided there is sufficient multipath in the environment, these matrix values can be determined through the use of advanced signal processing and then inverted to determine the original N transmitted signals from the N received signals. Under ideal conditions an N×N MIMO system will have N times the communication bandwidth of an equivalent single-input single-output (SISO) system.

As with all of the other technologies described here, if the device contains a test mode to enable only one antenna at a time, the TRP and TIS can be determined for each antenna separately. However, since the signal processing in MIMO combines signals from each antenna, the effective sensitivity of the entire DUT may be considerably different than the sensitivity of each individual radio. Ideally, if tests can be performed to determine the performance of all N receivers together relative to each receiver individually, then perhaps all that's needed is the TRP/TIS of each antenna/transceiver of the device for use as a modifier. That way the effects of the DUT body, platform noise, near-field phantoms, etc. have been taken into account, but all of the multipath, multiple communication channel behavior has been determined using N×N multipath channel emulators.

In this case, however, it's critical to have some sort of test mode(s) to be able to control the function of the device. Unfortunately, none of the 802.11 standards incorporate any sort of test mode, and 802.11n, which will be the first large scale use of MIMO technology, also combines the concept of adaptive arrays with MIMO to allow switching to a beam-forming mode as the signal drops in order to maintain higher data rates as the separation distance increases. Thus, as the received signals on each antenna near sensitivity, the device could switch to beam-forming mode to take advantage of array gain and improve the link budget for a SISO channel once the MIMO channels are no longer viable.

Without a test mode, there's little chance of getting much useful information out of the current OTA performance test systems. At best, it would never be clear how many transceivers were actually contributing to the measured performance. And since the sensitivity measurement process would typically cause a switch to a beam-forming mode, MIMO performance would never really be tested. Since full MIMO operation relies on N antennas on both devices in the link, as well as a rich multipath environment; the single measurement antenna, fully anechoic chamber test systems typically used for SISO testing won't produce suitable test signals.

Figure 5:
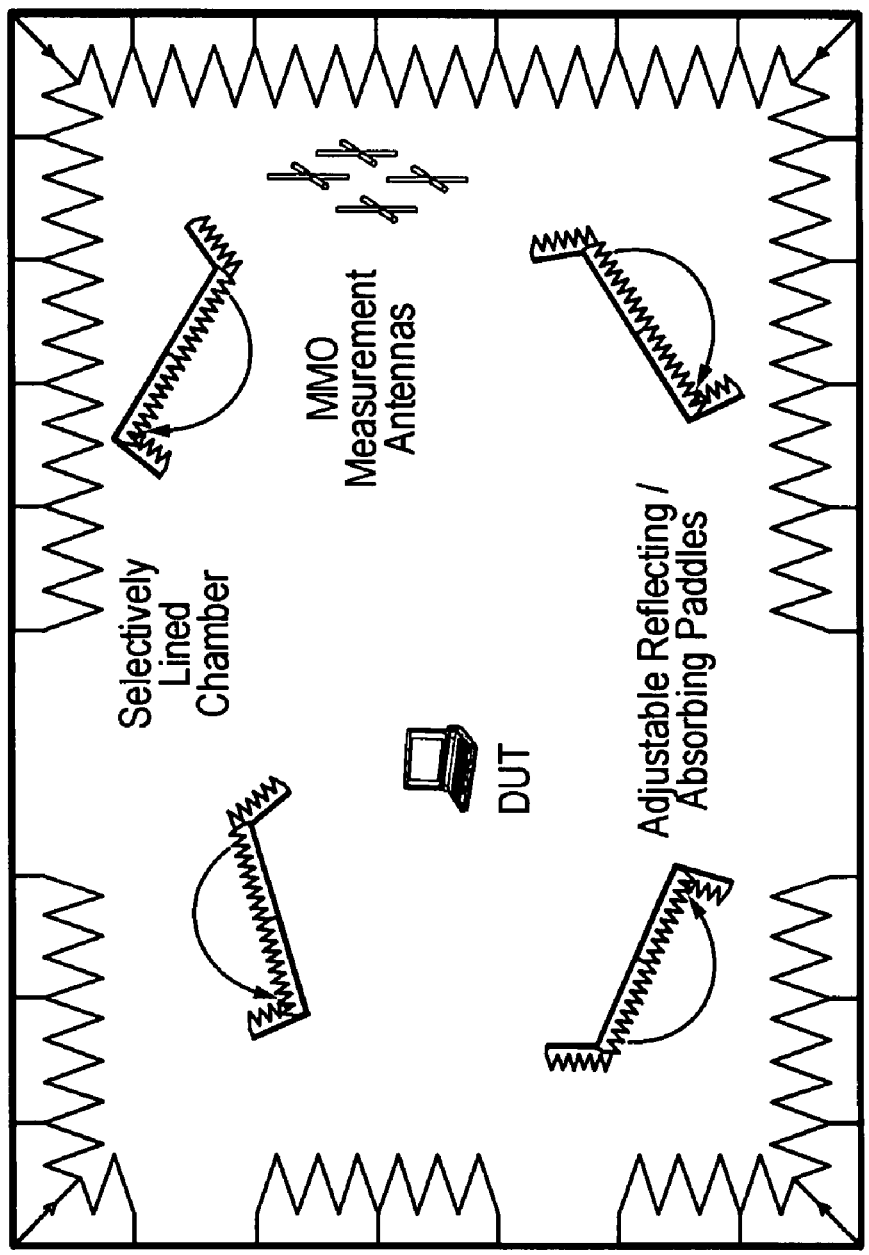
FIG. 5 depicts a selectively lined anechoic chamber with stir paddles and MIMO measurement antennas

Just adding N measurement antennas to the system wouldn't resolve the issues, as there's still no appreciable multipath. It would be possible to remove some absorber from the walls and/or add some reflecting surfaces into the room to create some known level of multipath, but traceability would be compromised. For tests to be reproduced in another lab, an identical multipath environment would have to be created, requiring precise control of dimensions and materials. This would be impractical. Through the use of adjustable paddles in combination with a partially lined room (i.e. a reverberation/anechoic chamber hybrid as in FIG. 5) it may be possible to create a variable environment that could be calibrated to provide a statistically predictable performance measurement. This would still be significantly affected by overall size and may not be the most practical solution.

A possible alternative that would maintain the traceable nature of the OTA tests while providing a rich simulation of multipath environments would be to marry components of the MIMO testing to the free-space environment currently used for OTA testing. For testing, an N×N channel emulator takes N input signals and digitally processes them to introduce the fading and delay spreads associated with whatever environmental channel model is selected. The signals are combined with different relative relationships at each of the N output ports as though they'd propagated along different paths to each of the N receiving antennas. Unfortunately, it's not possible to just attach a channel emulator to N antennas within a test chamber and be done. Since each of those N signals was intended to go to one and only one of the transceiver ports of the DUT, once they're propagated over the air, all of the antennas will receive all of the N signals in some unrealistic combination. The effect of the channel emulator will be completely destroyed.

Figure 6:
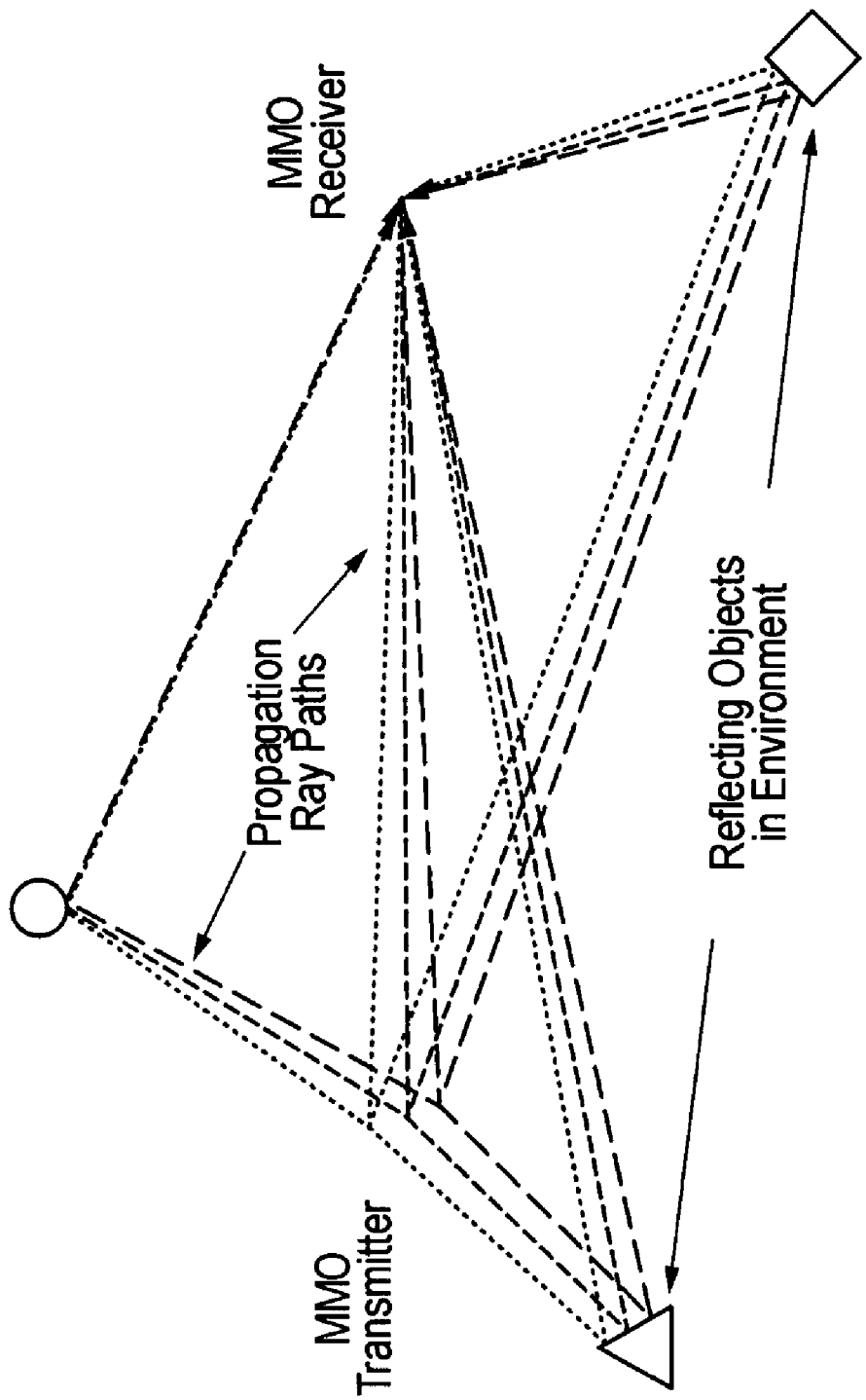
FIG. 6 depicts one example of multipath in a real world environment.
Figure 7:
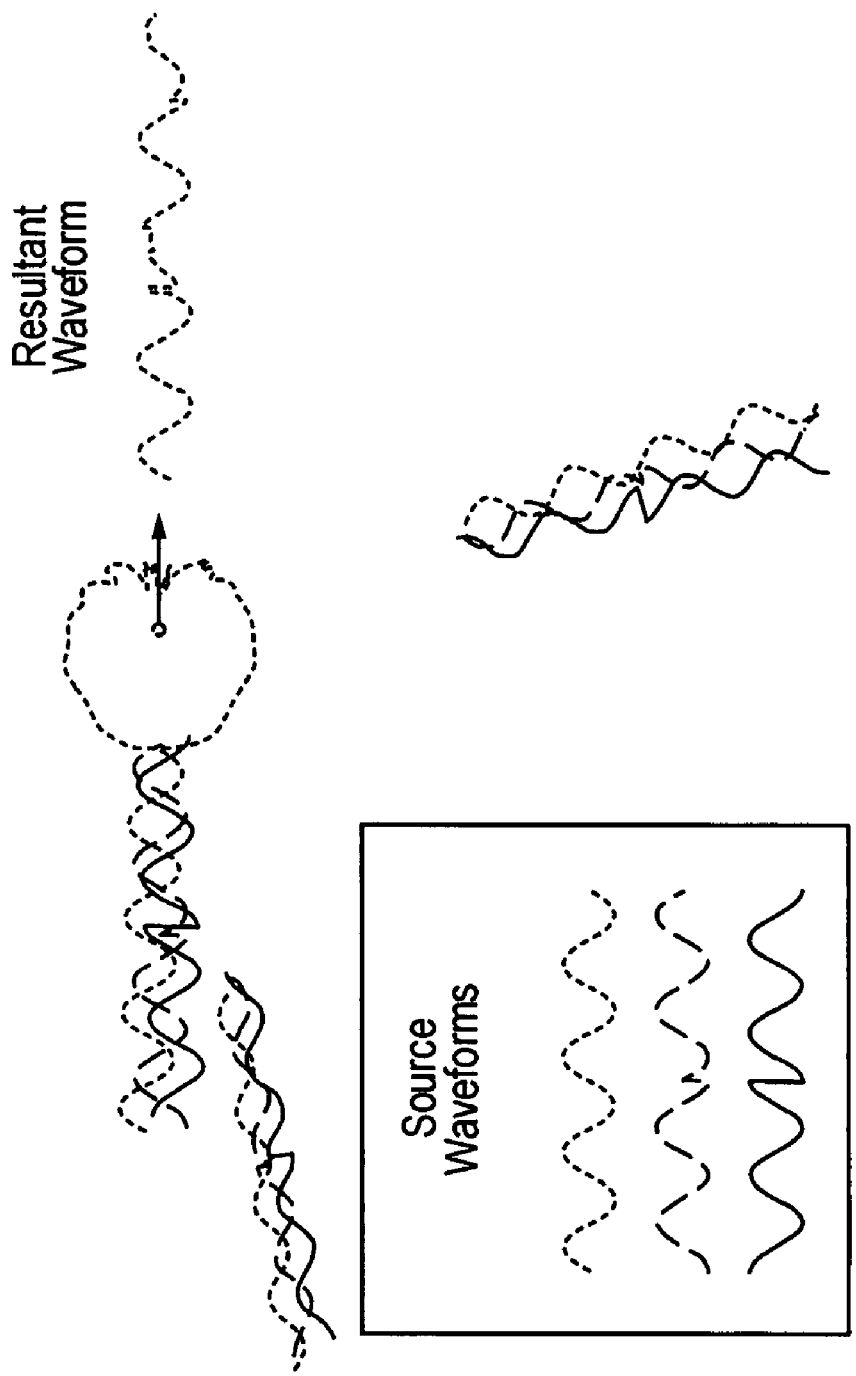
FIG. 7 depicts source waveforms arriving together from different angles to produce a resultant waveform.

As an alternate solution, consider the behavior of a MIMO system in a real world environment. The N signals from one device propagate through space, reflecting off of different objects in the environment and eventually reach a second device from all different directions (FIG. 6) and with all different magnitudes, phases, and delay times (delay spread is a critical factor in digital communication). Each antenna of the second device combines those signals based on its antenna pattern into the complex signal presented to the receiver (FIG. 7). The difference in position of the device, as well as any differences in the antenna pattern itself, result in a completely different signal at each receiver. A suitable multipath test system would need to reproduce this behavior.

To simulate the directional behavior of multipath, an array of six to eight antennas (or more) could be arranged around the DUT so that reflections from various quadrants could be simulated. Each antenna would have to provide a calibrated measurement path in order to be able to perform traceable measurements, and the quiet zone would need to be equivalent for each antenna. Rather than needing the full capabilities of a channel emulator that simulates all of the multipath effects for N channels, specialized channel models could be used to take N inputs and produce M outputs that only represent the relative relationship between N virtual transmitters and a number of reflectors in a given quadrant. Alternately a complex system of attenuators and delay lines could be used to generate the same type of behavior using passive devices.

Figure 8:
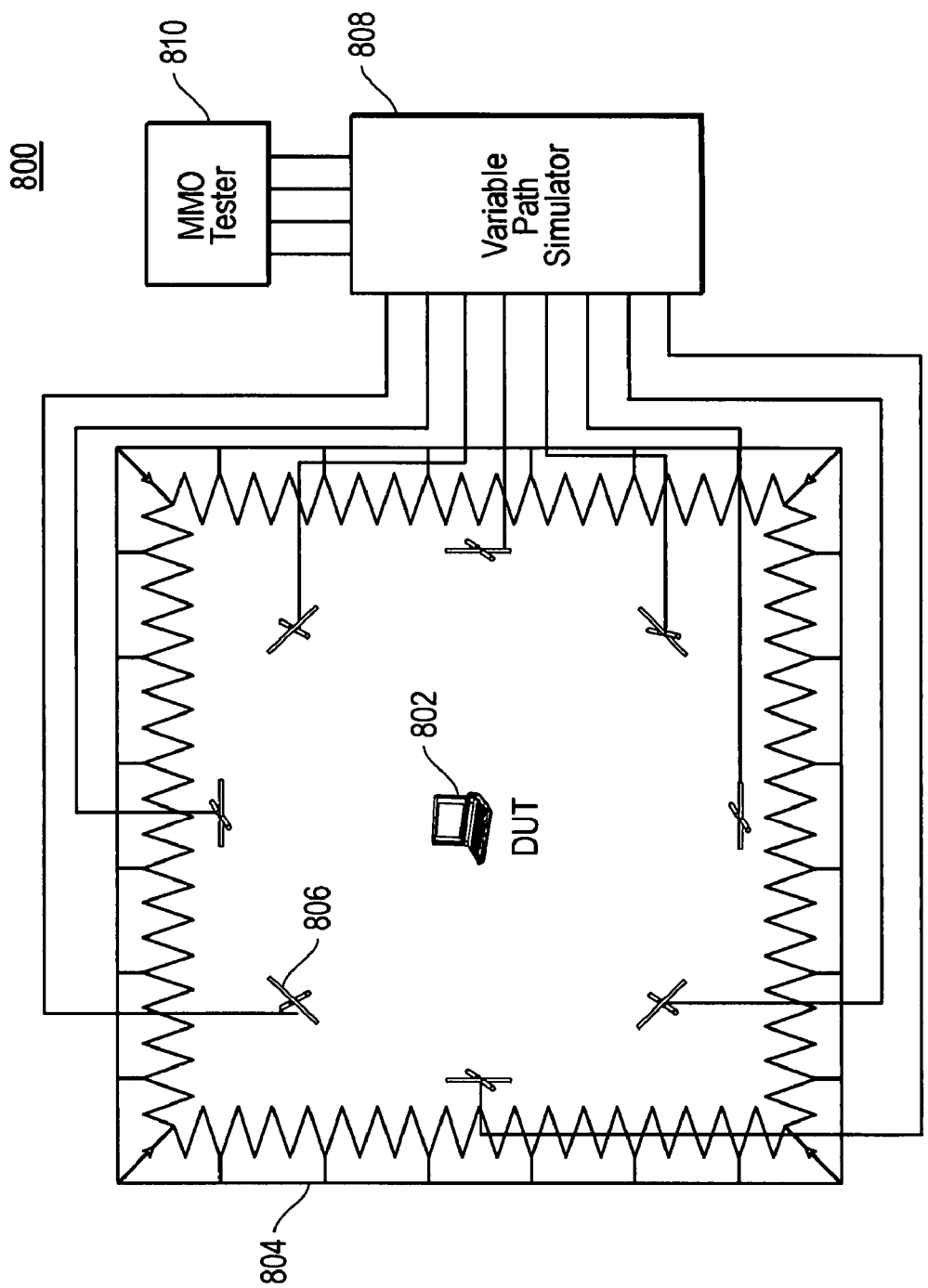
FIG. 8 depicts an embodiment for simulating multipath in a measurement.

FIG. 8 shows an embodiment 800 for multipath testing of a device under test (DUT) 802 that has multiple antennas. An object of a test may be to measure the performance of the antenna system of DUT 802 in an environment that simulates multipath propagation such as shown in FIG. 6. DUT 802 may be any device for which over the air performance in a multipath environment is to be evaluated. This may be a device capable of MIMO reception and transmission, adaptive beamforming, and/or antenna diversity. A set of antennas 806 surround DUT 802 within an anechoic chamber 804. The figure shows a plurality of antennas, each one capable of dual polarization. Each antenna 806 may receive and/or transmit signals to simulate propagation of reflected energy from a particular angle. Each of antennas 806 may be connected to a variable path simulator 808. Each antenna connects to a different path of variable path simulator 808. Each polarization of the dual polarized antenna may be connected to an equivalent port of the variable path simulator 808 with a different magnitude and/or phase relationship to simulate any desired polarization, including linear polarization of any orientation, or right- or left-hand circular or elliptical polarizations. Variable path simulator 808 may introduce a user-specifiable delay spread into each path. The delay spread introduced into each path may be different. In this way, with antennas 806 disposed at various angles around DUT 802, and with different path lengths introduced by path simulator 808, one may simulate a variety of real world multipath environments. That is, one may simultaneously simulate reflections from various angles at various distances.

Connected to path simulator 808 is a wireless communication tester 810. Communication tester 810 emulates the wireless transceiver a the other end of the wireless RF link, and measures either transmitter or receiver performance of the DUT 802 through the variable path simulator 808. The communication tester 810 may also introduce interference signals along one or more of the paths provided by the variable path simulator 808 and the measurement antennas 806 in order to determine the response of DUT 802 to interfering signals arriving from a given direction. Note that in this context, wireless communication tester 810 may be implemented in one box or be comprised of a variety of test equipment components required to perform testing of the DUT 802.

A 4 spatial-channel MIMO communication tester is shown in FIG. 8, but is not the only possible communication tester implementation. It is important to understand the difference between the N different spatial paths, which are simulated by antennas 806 and variable path simulator 808, and the MIMO channels emulated by MIMO tester 810, which emulates a transmitter/receiver with M spatial channels. In this implementation, the N spatial paths combine into M spatial channels through the variable path simulator 808. Conversely, the M spatial channels split into N spatial paths. This can be done passively using combiners/splitters, or can be done actively in electronics.

Thus, embodiments enable a user to simulate real world multipath environments. One embodiment is a test system for testing a wireless device in a multipath environment. The test system comprises a plurality of antennas disposed at various angles around a device under test within an anechoic chamber. The test system also comprises a variable path simulator with different paths connected to different ones of least a plurality of the antennas to introduce a delay spread in each path connected to an antenna. The angles of the antennas and the delays introduced by the variable path simulator enable simulation of simultaneous reflections at different angles and distances.

The variable path simulator may be implemented using passive devices. Or, it may comprise circuitry to simulate the separate paths and allows a user to specify a delay spread in each path. Indeed, a user interface may be provided that enables the user to program which antennas to use and what delay spread to insert in each path of the variable path simulator. Thus, a user may experiment to investigate different delay spreads at different angles. Existing channel models used for evaluating wireless device performance in conducted testing can be adapted to separate out various reflection clusters to different propagation paths in order to simulate arrival of those reflections from different directions. This allows determination of how the directional performance of the DUT's antenna(s) affect overall performance.

As previously noted, one or more of the antennas may exhibit dual polarization. In some embodiments, the device under test is mounted on a rotating pedestal to enable testing at more angles. Also, during a test, at least one antenna may be repositioned to change the geometry of the test. The goal of such positioning is to allow determining the average performance in all directions around the device by changing the direction of communication signals relative to the device. Note that the antennas can be equally disposed around the device under test or placed in any geometric configuration desirable. Thus, FIG. 8 shows a two dimensional configuration, but three-dimensional configurations are envisioned. In addition, in some embodiments, the anechoic chamber may only partially be lined with absorber in order to introduce additional reflective paths.

A given test would not necessarily use all of the available measurement antennas simultaneously, but could simulate any range of directions and magnitudes for the test. It's then up to the antennas of the DUT to combine those signals in whatever manner they would in real life. The DUT may still need to be moved in relationship to the antenna array to cover a full spherical pattern, and it may even be desirable to move the array antennas relative to each other. However, with a sufficient number of array antennas, the directional resolution should be sufficient that any desired configuration can be evaluated by just switching between antennas.

Varying polarization direction from each of the active antennas adds another degree of freedom. Through the use of dual polarized antennas connected to different ports of a path simulator, signals could even be generated such that simulated reflections arriving at different times (i.e. from different reflectors) could have different polarization orientations as well. By varying the magnitude and phase relationship of the signals applied to each element of the dual polarized antenna, any combination of linear, elliptical, or circularly polarized waves can be generated with any desired orientation.

Note that this system should not be confused with those multi-sensor systems currently on the market. Those systems only use one sensor at a time, while this concept uses multiple antennas and polarizations simultaneously to create multipath propagation similar to that seen in the real world.

As the usefulness of such a system becomes clear, there are certain questions that arise related to its application. For example, the system would be probing various portions of the pattern simultaneously, so the definition of TRP and TIS becomes questionable. However, by treating the received signal as a combination of the direct and reflected signals from a known virtual source, we have simply superimposed an environmental channel model on top of the performance of the DUT. In traditional link budgets, TRP and TIS serve as endpoints that give an average performance metric across all propagation directions. That information must be coupled with the appropriate environmental model (free-space Friis equation or Rayleigh or Rician fading) and fading desensitization information to determine actual end-to-end performance. In this case, the DUT would be tested under different multipath models to determine an average performance in each possible environment. The fading characteristics of the environment would already be incorporated into the TRP/TIS This system would also allow more dynamic testing of smart antenna systems, since both multipath behavior and response to outside interference could easily be evaluated. Many of the issues described for diversity systems are also overcome using such a system. In evaluating the behaviors being tested by this system, it becomes apparent that it may also be useful even for SISO testing. Current active tests only deal with magnitude patterns and average power performance. Thus, little is known about the way these devices combine multipath signals into the resultant decoded signal. This system could allow testing the finished device's response to a multipath environment and how other objects (near-field phantoms) around the device change that response.

Thus, one embodiment is a method for testing a wireless device by simulating a multipath environment. The method comprises placing antennas at various angles around the device under test within an anechoic chamber. The method further comprises connecting at least a plurality of the antennas to a variable path simulator to introduce a delay in each path connected to an antenna. The antennas receive or transmit spatially separate signals that propagate through the separate paths of the variable path simulator to simulate reflections at different angles and distances. In one embodiment, a path with a least amount of delay is a reference path that simulates a direct path between the DUT and the communication tester.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method of testing a wireless device by simulating a multipath environment, comprising:
   placing a plurality of antennas at various angles around the wireless device within an anechoic chamber;
   connecting the plurality of antennas to a variable path simulator having N multiple separate paths and simultaneously introducing a different user-defined delay spread into each separate path connected to an antenna, where N is an integer greater than 1, wherein each separate path of the variable path simulator is coupled to a different one of the plurality of antennas, and the user-defined delay spreads being chosen to provide significant multi-path fading effects;
   connecting the N multiple separate paths of the variable path simulator to M spatial channels of a wireless communication tester emulating a wireless transceiver having the M spatial channels, where M is an integer greater than 1; and
   simultaneously receiving or transmitting by the plurality of antennas, a plurality of signals, each signal associated with a different one of the plurality of antennas, and wherein each signal propagates through a separate one of the multiple separate paths of the variable path simulator to simulate a desired pattern of multi-path fading effects.

2. The method of claim 1, further comprising switching signals between one or more of the plurality of antennas to change a geometry of a simulation.

3. The method of claim 1, wherein a path of the variable path simulator with a least amount of delay is a reference path that simulates a direct path between a transmitter and receiver.

4. The method of claim 1, wherein the variable path simulator is implemented using only passive devices.

5. The method of claim 1, wherein the variable path simulator comprises circuitry to simulate the separate paths and allows a user to specify a different delay spread in each path.

6. A test system for testing a wireless device in a multipath environment, comprising:
   a plurality of antennas disposed at various positions around the wireless device under test within an anechoic chamber, the plurality of antennas capable of simultaneous operation;
   a variable path simulator with different paths connected to different ones of the plurality of antennas, the variable path simulator configured to simultaneously introduce a different delay spread into each path connected to an antenna, the delay spreads chosen to provide significant multi-path fading effects; and
   a wireless communication tester to communicate signals to the wireless device through the variable path simulator, the wireless communication tester emulating a wireless transceiver having M spatial channels coupled to N paths of the variable path simulator, where M and N are integers greater than 1.

7. The system of claim 6, wherein during a test, at least one antenna is repositioned to change a geometry of the test.

8. The system of claim 6, wherein the variable path simulator comprises circuitry to simulate the separate paths and allows a user to specify a delay spread in each path.

9. The system of claim 6, wherein the variable path simulator further comprises a user interface to enable the user to program which antennas to use, which polarization orientations to use, and what delay spread to insert in each path of the variable path simulator.

10. The system of claim 6, wherein the anechoic chamber is only partially lined with absorber.

11. The system of claim 6, wherein the antennas are approximately equally disposed around the device under test in two or three dimensions.

12. A system for testing a wireless device in a multi-path environment, comprising:
   a simulator to simultaneously simulate a plurality of separate spatial paths, each separate spatial path coupled to a different one of a plurality of antennas, the plurality of antennas capable of simultaneous operation, the simulator configured to introduce a different delay spread into each separate spatial path connected to an antenna, the delay spreads chosen to provide significant multi-path fading effects; and
   a Multiple Input Multiple Output (MIMO) tester to measure a signal in each of M emulated channels of a wireless transceiver emulated by the MIMO tester, the M emulated spatial channels coupled to N spatial paths of the simulator, where M and N are unequal integers greater than 1.

13. The system of claim 12, wherein the MIMO tester includes a plurality of RF sources, each RF source generating a separate one of the emulated channels.

14. The system of claim 12, wherein an excitation of an antenna is calculated to provide a selected polarization.

15. The system of claim 14, wherein the polarization is one of a circular polarization and an elliptical polarization.

16. The method of claim 1, wherein a plurality of sets of different delay spread combinations are provided to produce in succession a plurality of different multi-path fading environments.

17. The system of claim 6, wherein the delay spreads are chosen to produce phase shifts that are substantially greater than a wavelength of excitation in order to produce a particular multi-path fading environment.

18. The system of claim 1, wherein at least one of the antennas is a dual polarized antenna and wherein each polarization of a dual polarized antenna is connected to an equivalent port of the variable path simulator to simulate a selected one of a linear polarization, a circular polarization, and an elliptical polarization.

19. The system of claim 1, wherein the angles of the antennas and the delay spreads introduced by the variable path simulator enable simultaneous simulation of reflections at different angles and distances.

* * * * *

UNITED STATES PATENT AND TRADEMARK OFFICE
CERTIFICATE OF CORRECTION

PATENT NO. : 8,331,869 B2
APPLICATION NO. : 11/880867
DATED : December 11, 2012
INVENTOR(S) : Michael Foegelle Page 1 of 1

It is certified that error appears in the above-identified patent and that said Letters Patent is hereby corrected as shown below:

In the claims

In Column 10, line 56, Claim 18, replace "system" with --method--.

In Column 10, line 62, Claim 19, replace "system" with --method--.

Signed and Sealed this
Fourteenth Day of June, 2016

Michelle K. Lee
*Director of the United States Patent and Trademark Office*